United States Patent
Lee et al.

(10) Patent No.: US 8,861,181 B2
(45) Date of Patent: Oct. 14, 2014

(54) MULTILAYER CERAMIC ELECTRONIC COMPONENT

(71) Applicant: Samsung Electro-Mechanics Co., Ltd., Gyunggi-do (KR)

(72) Inventors: Chang Ho Lee, Gyunggi-do (KR); Dong Hwan Seo, Gyunggi-do (KR); Sang Hyun Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 85 days.

(21) Appl. No.: 13/745,124

(22) Filed: Jan. 18, 2013

(65) Prior Publication Data

US 2013/0242457 A1   Sep. 19, 2013

(30) Foreign Application Priority Data

Mar. 13, 2012 (KR) .................. 10-2012-0025782

(51) Int. Cl.
*H01G 4/06* (2006.01)
*H01G 4/008* (2006.01)
*H01G 4/232* (2006.01)
*H01G 4/30* (2006.01)
*H01G 4/12* (2006.01)

(52) U.S. Cl.
CPC ............. *H01G 4/008* (2013.01); *H01G 4/30* (2013.01); *H01G 4/2325* (2013.01); *H01G 4/232* (2013.01); *H01G 4/12* (2013.01)
USPC .............. 361/321.2; 361/301.2; 361/301.4; 361/306.1; 361/306.3; 361/321.1

(58) Field of Classification Search
USPC ............... 361/321.2, 303–305, 306.1, 306.3, 361/301.2, 301.4, 311–313, 321.1
See application file for complete search history.

(56) References Cited

U.S. PATENT DOCUMENTS

| | | | |
|---|---|---|---|
| 6,344,427 B1 * | 2/2002 | Komatsu et al. .............. | 501/138 |
| 6,903,919 B2 * | 6/2005 | Kayatani et al. ........... | 361/321.2 |
| 7,304,831 B2 * | 12/2007 | Yoshii et al. ................ | 361/321.2 |
| 7,968,486 B2 * | 6/2011 | Yamaguchi ................... | 501/139 |
| 8,174,816 B2 * | 5/2012 | Seo et al. .................... | 361/321.2 |
| 8,208,240 B2 * | 6/2012 | Yamazaki et al. .......... | 361/321.4 |

FOREIGN PATENT DOCUMENTS

| | | |
|---|---|---|
| JP | 8-107039 A | 4/1996 |
| JP | 2007-067239 A | 3/2007 |

* cited by examiner

*Primary Examiner* — Nguyen T Ha

(74) *Attorney, Agent, or Firm* — McDermott Will & Emery LLP

(57) ABSTRACT

There is provided a multilayer ceramic electronic component, including: a ceramic main body having internal electrodes laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, L1 is a length from either end of the ceramic main body in the length direction thereof to an end of the first layer formed on an upper surface or a lower surface of the ceramic main body, T1 is a thickness of the first layer, and T2 is a thickness of the second layer, Tc≤70 μm, T2≥(1.5)T1, and L1<(1.5)Tc are satisfied, thus providing excellent reliability.

14 Claims, 2 Drawing Sheets

MULTILAYER CERAMIC ELECTRONIC COMPONENT

CROSS-REFERENCE TO RELATED APPLICATIONS

This application claims the priority of Korean Patent Application No. 10-2012-0025782 filed on Mar. 13, 2012, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a multilayer ceramic electronic component having excellent reliability.

2. Description of the Related Art

In electronic components for use in industrial electronic devices, defects such as warpage, cracks, and the like, may cause lack of functionality therein, and thus, reliability is important. In order to prevent the occurrence of cracks, a technique of forming a portion of an external electrode with a conductive resin layer has been introduced.

However, even in the case in which a portion of the external electrode is formed of the conductive resin layer, a cover layer needs to be thinner, as products tend to have ever-higher capacitances. The thinner cover layer may lead to the possibility of cracks occurring in electronic components when a substrate warps after the mounting of the electronic components on the substrate.

In the area of electronic components for use in industrial electronic devices, in which product reliability is considered important, even in the case in which cracks occur due to substrate warping, it is necessary to prevent cracks from negatively affecting electronic component performance.

RELATED ART DOCUMENTS (Patent Document 1) Japanese Patent Laid-Open Publication No. 2007-067239
(Patent Document 2) Japanese Patent Laid-Open Publication No. 1996-107039

SUMMARY OF THE INVENTION

An aspect of the present invention provides a multilayer ceramic electronic component having excellent reliability.

According to an aspect of the present invention, there is provided a multilayer ceramic electronic component, including: a ceramic main body having internal electrodes laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, L1 is a length from either end of the ceramic main body in the length direction thereof to an end of the first layer formed on an upper surface or a lower surface of the ceramic main body, T1 is a thickness of the first layer at either end of the ceramic main body in a thickness direction thereof, and T2 is a thickness of the second layer at either end of the ceramic main body in the thickness direction thereof, Tc≤70 μm, T2≥(1.5)T1, and L1<(1.5)Tc are satisfied.

The multilayer ceramic electronic component may be 1005-sized or greater.

When L2 is a length from either end of the ceramic main body in the length direction thereof to an end of the second layer formed on the upper surface or the lower surface of the ceramic main body, (1.5)L1≤L2 may be satisfied.

When L2 is a length from either end of the ceramic main body in the length direction thereof to an end of the second layer formed on the upper surface or the lower surface of the ceramic main body, and L is a length of the ceramic main body, L2≤(⅓)L may be satisfied.

When L2 is a length from either end of the ceramic main body in the length direction thereof to an end of the second layer formed on the upper surface or the lower surface of the ceramic main body, and L is a length of the ceramic main body, (1.5)L1≤L2≤(⅓)L may be satisfied.

The conductive metal may include at least one selected from the group consisting of gold, silver, palladium, copper, nickel, and alloys thereof.

The conductive resin may include at least one selected from the group consisting of a silver (Ag)-epoxy resin, a copper (Cu)-epoxy resin, and a copper (Cu)-coated silver (Ag) resin.

According to another aspect of the present invention, there is provided a multilayer ceramic electronic component, including: a ceramic main body having internal electrodes alternately laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, L1 is a length from either end of the ceramic main body in the length direction thereof to an end of the first layer formed on an upper surface or a lower surface of the ceramic main body, L2 is a length from either end of the ceramic main body in the length direction thereof to an end of the second layer formed on the upper surface or the lower surface of the ceramic main body, and L is a length of the ceramic main body, Tc≤70 μm and (1.5) L1≤L2≤(⅓)L are satisfied.

The multilayer ceramic electronic component may be 1005-sized or greater.

The multilayer ceramic electronic component may satisfy L1<(1.5)Tc.

When T1 is a thickness of the first layer at either end of the ceramic main body in a thickness direction thereof, and T2 is a thickness of the second layer at either end of the ceramic main body in the thickness direction thereof, T2≥(1.5)T1 may be satisfied.

The multilayer ceramic electronic component may satisfy L1<(1.5)Tc.

The conductive metal may include at least one selected from the group consisting of gold, silver, palladium, copper, nickel, and alloys thereof.

The conductive resin may include at least one selected from the group consisting of a silver (Ag)-epoxy resin, a copper (Cu)-epoxy resin, and a copper (Cu)-coated silver (Ag) resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
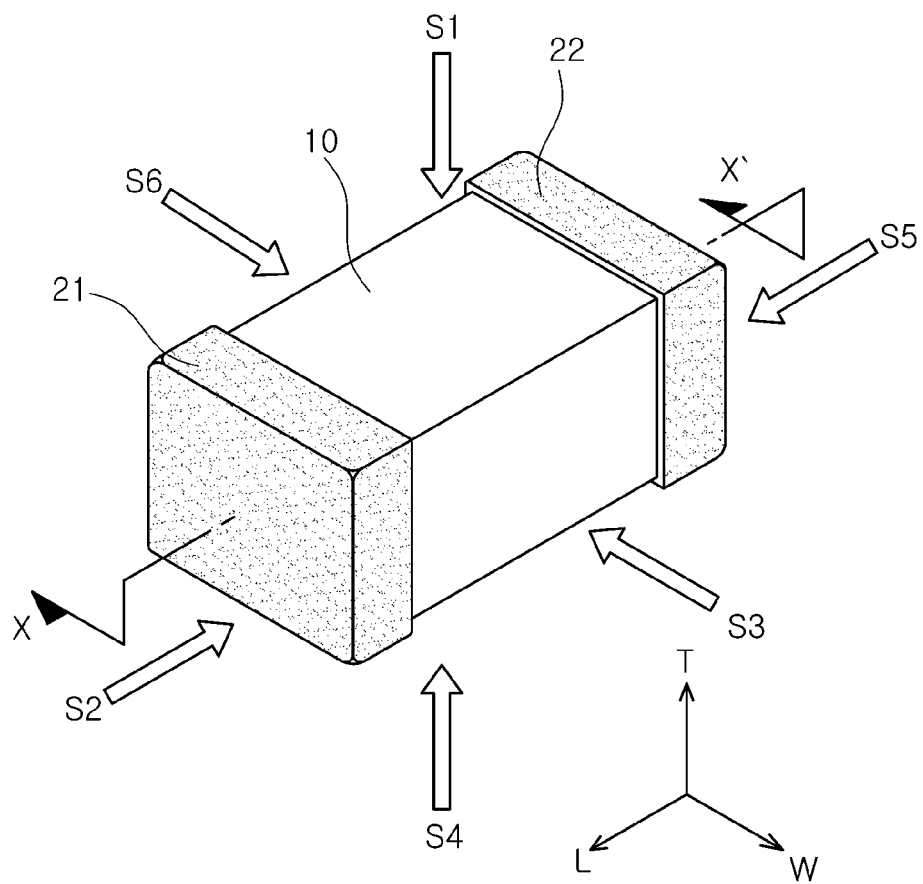
FIG. 1 is a perspective view of a multilayer ceramic electronic component according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
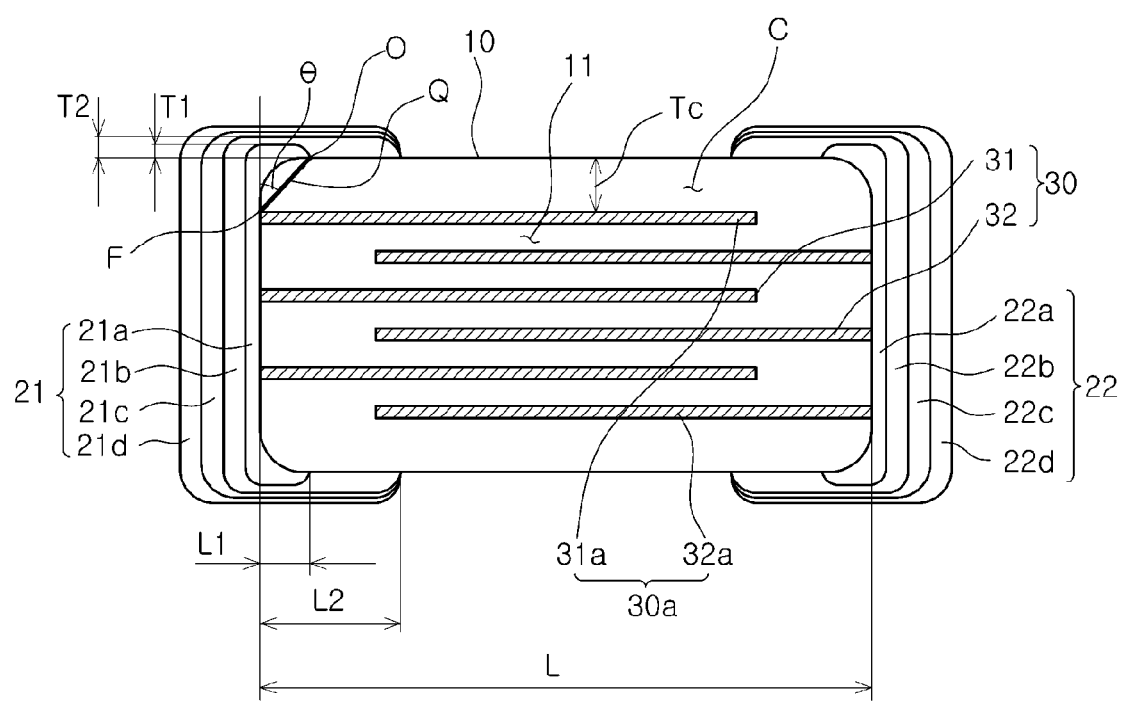
FIG. 2 is a cross-sectional view taken along line X-X' of FIG. 1.

FIG. 1 is a perspective view of a multilayer ceramic electronic component according to an embodiment of the present invention. FIG. 2 is a cross-sectional view taken along line X-X' of FIG. 1.

Referring to FIGS. 1 and 2, a multilayer ceramic electronic component according to an embodiment of the present invention may include a ceramic main body 10, internal electrodes 30 laminated on the inside of the ceramic main body 10, and external electrodes 21 and 22 formed on the outside of the ceramic main body 10.

The ceramic main body 10 may have a parallelpiped shape. The terms, "length direction", "width direction", and "thickness direction" may be designated by "L direction", "W direction", and "T direction" in FIG. 1, respectively. Here, the thickness direction may refer to a direction in which the internal electrodes are laminated.

As for the ceramic main body 10, the length thereof is larger than the width thereof and the thickness thereof may be equal to the width thereof. The ceramic main body 10 may have an upper surface S1, a lower surface S4, side surfaces S3 and S6, and end surfaces S2 and S5.

The ceramic main body 10 may include a dielectric material having a high dielectric constant, and may specifically include barium titanate or strontium titanate, without being limited thereto.

Since the dielectric material is electrically dipolar, it may store a larger electrical charge.

An area from the upper surface S1 to the uppermost internal electrode 31a in the ceramic main body 10 may be designated as a cover layer C. Also, an area from the lower surface S4 to the lowermost internal electrode 32a in the ceramic main body 10 may be also designated as a cover layer C.

The internal electrodes 30 may be laminated and spaced apart from each other inside the ceramic main body 10. Adjacent internal electrodes 31 and 32 may be withdrawn in opposing directions, and electric currents having opposing polarities may be applied thereto.

The internal electrode 30 may include at least one selected from the group consisting of gold, silver, copper, nickel, palladium, platinum, and alloys thereof, but is not limited thereto. Any material may be used therefor without particular limitation so long as it can impart conductivity to the internal electrode 30.

Gold, silver, palladium, platinum, and the like are noble metals and are thus relatively expensive, but chemically stable. Nickel, copper, and the like are base metals, and are thus relatively cheap. However, since they are easily oxidizable during a sintering procedure, a reducing atmosphere may be necessary for the sintering procedure.

The external electrodes may be formed on both ends of the ceramic main body 10 in a length direction ("L direction") thereof, and may include first and second external electrodes 21 and 22. Electric currents having opposite polarities may be applied to the first and second external electrodes 21 and 22. The first external electrode 21 may include first and second layers 21a and 21b, and the second external electrode 22 may include first and second layers 22a and 22b.

The first layers 21a and 22a may be formed on the ceramic main body 10, and may be formed of metal.

The first layers 21a and 22a may be directly connected to the internal electrodes 31 and 32. A metal constituting the first layers 21a and 22a and a metal constituting the internal electrodes 31 and 32 may form an alloy at connection portions therebetween. Hereby, the external electrodes 21 and 22 may be strongly connected to the internal electrodes 31 and 32.

The first layers 21a and 22a may be formed by using a conductive paste including conductive metals and glass frit, but are not limited thereto. Here, the conductive metal may include at least one selected from the group consisting of gold, silver, palladium, copper, nickel, and alloys thereof.

However, since the first layers 21a and 22a are formed of metal or glass, the first layers 21a and 22a are vulnerable to external impacts. Since metal and glass have a low degree of toughness, the external electrodes 21 and 22 may be disconnected from the internal electrodes 31 and 32 due to external impacts.

The second layers 21b and 22b may be formed on the first layers 21a and 22a, respectively, and may include a conductive resin.

The conductive resin may include at least one selected from the group consisting of a silver (Ag)-epoxy resin, a copper (Cu)-epoxy resin, and a copper (Cu)-coated silver (Ag) resin. That is, the conductive resin may be prepared by using a paste including an epoxy resin and at least one selected from the group consisting of silver (Ag) powder, copper (Cu) powder, and copper (Cu)-coated silver (Ag) powder.

The silver (Ag) powder or the copper (Cu) powder may impart conductivity to the second layers 21b and 22b. Any material may be used therefor without particular limitation so long as it can impart conductivity to the second layers 21b and 22b.

The epoxy resin may impart elasticity to the second layers 21b and 22b. The epoxy resin may absorb external impacts applied thereto, and thus, impact resistance thereof may be improved.

The first external electrode 21 may include first and second plating layers 21c and 21d, and the second external electrode 22 may include first and second plating layers 22c and 22d. The first plating layers 21c and 22c and the second plating layers 21d and 22d may be formed for ease of mountability.

The first plating layers 21c and 22c may be formed on the second layers 21b and 22b, respectively, and the second plating layers 21d and 22d may be formed on the first plating layers 21c and 22c, respectively. The first plating layers 21c and 22c may be nickel plating layers, and the second plating layers 21d and 22d may be tin plating layers.

Hereinafter, a situation in which cracks occur in portions of the ceramic main body in which the internal electrodes are connected to the external electrodes will mainly be described.

According to the present embodiment, even in the case in which cracks occur in the connection portions of the internal and external electrodes of the ceramic main body, product performance may not be affected thereby.

In the present embodiment, each cover layer C of the ceramic main body 10 may have a thickness Tc of 70 μm or less.

The thickness Tc of the cover layer C may be an average value obtained by measuring thicknesses at 10 equidistant points on the cover layer C, extracted from an image obtained by scanning a cross section of a central portion of the ceramic main body 10 taken in the length and thickness directions thereof with a scanning electron microscope, and then averaging the measured thicknesses.

The central portion of the ceramic main body 10 may be equivalent to a region within 45% of the total width of the ceramic main body 10 in both directions outwardly of the center of the ceramic main body 10 in the width direction (W direction) thereof. The thickness Tc of the cover layer may have a stable value within the above range.

When Tc exceeds 70 μm, warping and cracks do not occur, since the cover layer C is relatively thick. As the multilayer ceramic electronic component is highly laminated and thus has increased capacitance, the thickness Tc of the cover layer may be reduced to 70 μm or less, which may cause warping and cracks.

The embodiment of the present invention is provided to solve cracks occurring when the thickness Tc of the cover layer is 70 μm or less and defects occurring due to the cracks.

In the present embodiment, $L1<(1.5)Tc$ may be satisfied.

That is, a length L1 from either end of the ceramic main body 10 in the length direction thereof to an end of each of the first layers 21a and 22a formed on the upper surface S1 or the lower surface S4 of the ceramic main body 10 may be 1.5 times smaller than the thickness Tc of the cover layer C of the ceramic main body 10.

The formation of the second layers 21b and 22b, made of a conductive resin, may prevent or reduce the occurrence of a crack Q. Even in the case in which the crack Q occurs, when $L1/Tc<1.5$, the crack Q cannot penetrate the outermost internal electrodes 30a.

Since the crack Q does not penetrate the outermost internal electrodes 30a in the spite of the occurrence thereof, a failure to implement designed capacitance, or the like, can be avoided. This fail safe mode may particularly be required in industrial electronic devices requiring reliability.

The outermost internal electrodes 30a may refer to the uppermost internal electrode 31a positioned highest among the internal electrodes 30 and the lowermost internal electrode 32a positioned lowest among the internal electrodes 30.

Referring to FIG. 2, the crack Q may occur at the end O of the first layer 21a of the first external electrode 21 made of metal. The reason is that stress is concentrated on the end O of the first layer 21a since the first layer 21a is made of metal and thus has a high level of hardness, while the first layer 21a has a low stress-absorption capability.

The crack Q may start from the end O of the first layer 21a, proceed inside the ceramic main body 10, and terminate at an interface F with the first layer 21a.

The crack Q may be formed in an almost linear manner, and may make an angle of about 50° to 60° with respect to the end surface S2 or S5 of the ceramic main body 10. The angle between the end surface S2 or S5 of the ceramic main body 10 and the crack Q may be a crack angle θ. The condition, $L1<(1.5)Tc$ may be determined in consideration of the crack angle θ.

If $L1≥(1.5)Tc$, the crack Q occurring due to warping of the substrate or the like may penetrate the outermost internal electrode 30a. In this case, internal electrodes electrically separated from each other may not contribute to capacitance formation. That is, the outermost internal electrode 30a may lose functionality, and thus, designed capacitance may not be implemented.

In the present embodiment, $T2≥(1.5)T1$ may be satisfied.

That is, a thickness T2 of each of the second layers 21b and 22b at either end of the ceramic main body 10 in the thickness direction thereof may be 1.5 times or greater than a thickness T1 of each of the first layers 21a and 22a at either end of the ceramic main body 10 in the thickness direction thereof.

T1 and T2 may be average values obtained by measuring thicknesses at 10 equidistant points on the first and second layers extracted from the image obtained by scanning the cross section of the central portion of the ceramic main body 10 in the length and thickness directions thereof with a scanning electron microscope, and then averaging the measured thicknesses.

The central portion of the ceramic main body 10 may be equivalent to a region within 45% of the total width of the ceramic main body 10 in both directions outwardly of the center of the ceramic main body 10 in the width direction (W direction) thereof. T1 and T2 may each have a stable value within the above range.

When T2 is 1.5 times thicker than T1, the occurrence of cracks due to warping of the substrate may be prevented or reduced.

Warping stress of the substrate may be transferred to the electronic component through a contact portion of the electronic component and the substrate, and thus the cracks may occur in the electronic component. It may be determined whether the warping stress is absorbed or the warping stress has been transferred to the ceramic main body 10 of the electronic component as it is, thereby to inducing the occurrence of the crack Q, depending on the properties of portions of the electronic component mounted on the substrate.

Since the electronic component is mounted on the substrate through the external electrodes, it may be determined whether or not the warping stress has been transferred depending on the properties of the external electrodes. In the case in which the second layers 21b and 22b of the external electrodes 21 and 22 are sufficiently thick, the second layers 21b and 22b can sufficiently absorb the warping stress, and thus the warping stress of the substrate may not be transferred to the ceramic main body 10 of the electronic component as it is. Therefore, since the warping stress can hardly reach a critical value at which the occurrence of cracks is induced in the ceramic main body 10, the crack Q may not easily occur.

If $T2<(1.5)T1$, that is, in the case in which the thickness of each of the second layers 21b and 22b T2 is smaller than 1.5 times the thickness of each of the first layers 21a and 22a T1, the crack Q may occur due to warping or the like. The reason is that each of the second layers 21b and 22b is relatively thin, and thus cannot sufficiently absorb external impacts.

In the present embodiment, $(1.5)L1≤L2≤(1/3)L$ may be satisfied.

That is, a length L2 from either end of the ceramic main body 10 in the length direction thereof to an end of each of the second layers 21b and 22b formed on the upper surface S1 or the lower surface S4 of the ceramic main body 10 may be equal to or greater than 1.5 times the length L1 from either end of the ceramic main body 10 in the length direction thereof to the end of each of the first layers 21a and 22a formed on the upper surface S1 or the lower surface S4 of the ceramic main body 10, and may be ⅓ or less of a length L of the ceramic main body 10.

If $L2<(1.5)L1$, the occurrence of the crack Q may not be prevented or reduced. The reason is that the contact area of the second layers 21b and 22b and the ceramic main body 10 is small, and thus the second layers 21b and 22b cannot sufficiently absorb the stress present in the ceramic main body 10.

The occurrence of the crack Q can be prevented or reduced in the ceramic main body 10, by allowing the second layers 21b and 22b to absorb stress that may be present in the ceramic main body 10 and induce an occurrence of the crack Q. Therefore, since the contact area of the second layers 21b and 22b and the ceramic main body 10, that is, the route for absorbing the stress is narrow, the occurrence of the crack Q cannot be prevented or reduced in the ceramic main body 10.

If L2>(⅓)L, flashover may occur. In the case in which the distance between the first and second external electrodes 21 and 22 to which electric currents having opposite polarities are applied is short to thereby exceed the withstand voltage strength of air, insulation breakdown of air may occur, which causing flashover.

In the present embodiment, the multilayer ceramic electronic component may be 1005-sized or greater.

1005 size may be defined as (1.0±0.15 mm)×(0.5±0.05 mm).

Hereinafter, the present invention will be described in detail, with reference to inventive examples and comparative examples.

A multilayer ceramic capacitor according to each inventive example was manufactured as follows.

A barium titanate powder, ethanol as an organic solvent, and polyvinylbutyral as a binder were mixed, followed by ball milling, thereby preparing a ceramic slurry. Ceramic green sheets were produced by using the ceramic slurry.

A conductive paste for an internal electrode containing nickel was printed on the ceramic green sheets, to form internal electrodes thereon. The resultant sheets were laminated to produce a green laminate, and the green laminate was then subjected to isostatic pressing with a pressure of 1,000 kgf/cm² at 85° C.

The compressed green laminate was cut into green chips, and the cut green chips were then subjected to a debindering process in which they were maintained at a temperature of 230° C. under an air atmosphere for 60 hours. The green chip was sintered at 950° C., to produce a sintered chip. The sintering process was performed under a reducing atmosphere to prevent oxidation of the internal electrodes. The reducing atmosphere was set to $10^{-11} \sim 10^{-10}$ atm, lower than the Ni/NiO equilibrium oxygen partial pressure.

First layers were formed on outer surfaces of the sintered chip by using a first paste including a copper powder and a glass powder.

Second layers formed of a conductive resin were formed to cover the first layers, respectively, by using a second paste. A paste containing epoxy, silver (Ag), and a hardening agent was used as the second paste, and then the second layers were cured by applying heat thereto.

Nickel and tin plating layers were sequentially formed on each of the second layers, respectively, through electroplating.

First, in order to investigate whether or not cracks occur as the thickness of a cover layer is decreased, a multilayer ceramic capacitor sample in which the thickness of the cover layer was varied was manufactured. The sample was mounted on a substrate, and then a warpage test was performed thereupon. After the test, a cross section of the sample was inspected with a high-resolution microscope to confirm the occurrence or non-occurrence of cracks.

In the warpage test, it was determined whether or not the sample was defective or not according to the change in capacitance by mounting the sample on the substrate and applying weight to a rear surface of the substrate on which the sample was mounted for 5 seconds.

The substrate was pressed to be deformed by 3 mm for Class 1 and 2 mm for Class 2, and the reference for determining warping strength was set as a range of ±10% of an initial capacitance value.

TABLE 1

| | Tc (μm) | L1 (μm) | L2 (μm) | T1 (μm) | T2 (μm) | T2/T1 | Number of Cracks |
|---|---|---|---|---|---|---|---|
| 1 | 85 | 125 | 150 | 5 | 2.5 | 0.5 | 0/100 |
| 2 | 80 | 125 | 150 | 5 | 2.5 | 0.5 | 0/100 |
| 3 | 75 | 125 | 150 | 5 | 2.5 | 0.5 | 0/100 |
| 4 | 70 | 125 | 150 | 5 | 2.5 | 0.5 | 70/100 |
| 5 | 65 | 125 | 150 | 5 | 2.5 | 0.5 | 75/100 |
| 6 | 60 | 125 | 150 | 5 | 2.5 | 0.5 | 82/100 |

Referring to Table 1, it can be confirmed that cracks occurred as the thickness of the cover layer was reduced to 70 μm or less. The object of the present invention is to solve the problem of cracks occurring as the thickness of the cover layer is reduced to 70 μm or less.

Next, in order to confirm a decrease in the occurrence of cracks, the thickness of the cover layer after sintering was set to 65 μm and the thicknesses T1 and T2 of the first and second layers of the external electrodes were varied. The warpage test results are shown in Table 2.

TABLE 2

| | Tc (μm) | L1 (μm) | L2 (μm) | T1 (μm) | T2 (μm) | T2/T1 | Number of Cracks |
|---|---|---|---|---|---|---|---|
| Inventive Example 1 | 65 | 125 | 150 | 5 | 12.5 | 2.5 | 9/100 |
| Inventive Example 2 | | 125 | 150 | 5 | 10 | 2.0 | 10/100 |
| Inventive Example 3 | | 125 | 150 | 5 | 7.5 | 1.5 | 14/100 |
| Comparative Example 1 | | 125 | 150 | 5 | 5 | 1.0 | 61/100 |
| Comparative Example 2 | | 125 | 150 | 5 | 2.5 | 0.5 | 64/100 |

Referring to Table 2, it can be confirmed that the occurrence of cracks was significantly decreased when T2/T1 was 1.5 or greater. This was due to the second layer being thicker than the first layer in the external electrode, and thus, the second layer sufficiently absorbed stress applied thereto.

Next, in order to confirm whether or not the cracks penetrated the internal electrodes, L1 was varied while Tc was set to 70 μm and T2/T1 was set to 1.0. The warpage test results are shown in Table 3.

TABLE 3

| | Tc (μm) | L1 (μm) | L2 (μm) | T1 (μm) | T2 (μm) | T2/T1 | L1/Tc | Penetration or Non-penetration of Cracks into Internal Electrode |
|---|---|---|---|---|---|---|---|---|
| Comparative Example 3 | 65 | 160 | 190 | 5 | 5 | 1.0 | 2.5 | Penetration |

TABLE 3-continued

| | Tc (μm) | L1 (μm) | L2 (μm) | T1 (μm) | T2 (μm) | T2/T1 | L1/Tc | Penetration or Non-penetration of Cracks into Internal Electrode |
|---|---|---|---|---|---|---|---|---|
| Comparative Example 4 | | 130 | 190 | 5 | 5 | | 2.0 | Penetration |
| Comparative Example 5 | | 95 | 190 | 5 | 5 | | 1.5 | Penetration |
| Inventive Example 4 | | 65 | 190 | 5 | 5 | | 1.0 | Non-penetration |
| Inventive Example 5 | | 30 | 190 | 5 | 5 | | 0.5 | Non-penetration |

Referring to Table 3, it can be confirmed that when L1/Tc was 1.5 or greater, cracks penetrated the internal electrode, and when L1/Tc was smaller than 1.5, cracks did not penetrate the internal electrode. That is, in the case in which L1 was 1.5 times larger than Tc, cracks penetrated the internal electrode. This corresponds to the fact that a crack may be formed at an angle of 56.3° with respect to the cross section in the length direction of the ceramic main body.

The lengths L1 and L2 of the first and second layers of the external electrode were varied in order to reduce the occurrence of cracks. The warpage test results are shown in Table 4. The thickness Tc of the cover layer after sintering was set to 65 μm and T2/T1 was set to 1.0.

In addition, the results with respect to occurrence of flashover, in association with L2, are shown in Table 4.

TABLE 4

| | Tc (μm) | L1 (μm) | L2 (μm) | T1 (μm) | T2 (μm) | T2/T1 | L2/L1 | L2/L | Number of Cracks | Occurrence or Non-occurrence of Flashover |
|---|---|---|---|---|---|---|---|---|---|---|
| Comparative Example 6 | 65 | 125 | 315 | 5 | 5 | 1.0 | 2.5 | 2/5 | 8/100 | Occurrence |
| Comparative Example 7 | | 125 | 250 | 5 | 5 | | 2.0 | 1/3 | 12/100 | Non-occurrence |
| Inventive Example 6 | | 125 | 190 | 5 | 5 | | 1.5 | 1/4 | 10/100 | Non-occurrence |
| Inventive Example 7 | | 125 | 150 | 5 | 5 | | 1.0 | 1/5 | 55/100 | Non-occurrence |

Referring to Table 4, it can be confirmed that the occurrence of cracks was remarkably reduced in the case in which L2 was 1.5 times larger than L1. The reason is that the contact area of the ceramic main body and the second layer is large, and thus, the second layer can effectively absorb the stress of the ceramic main body.

In addition, it can be seen that in the case in which L2/L was ⅓ of L or greater, that is, L2 was greater than ⅓ of L, flashover occurred. The reason is that external electrodes having opposite polarities are positioned excessively close together.

As set forth above, according to embodiments of the present invention, the occurrence of warping and cracks can be lowered by introducing a conductive resin layer. Further, even in the case in which the warping and cracks occur, a predetermined capacitance value can be realized by preventing cracks from passing through internal electrodes. Hereby, a multilayer ceramic electronic component having excellent reliability can be realized.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
a ceramic main body having internal electrodes laminated therein; and
external electrodes formed on both ends of the ceramic main body in a length direction thereof,
wherein each of the external electrodes includes a first layer formed on the ceramic main body and including a conductive metal, and a second layer formed on the first layer and including a conductive resin, and
when Tc is a thickness of a cover layer of the ceramic main body, L1 is a length from either end of the ceramic main body in the length direction thereof to an end of the first layer formed on an upper surface or a lower surface of the ceramic main body, T1 is a thickness of the first layer at either end of the ceramic main body in a thickness direction thereof, and T2 is a thickness of the second layer at either end of the ceramic main body in the thickness direction thereof, $Tc \leq 70$ μm, $T2 \geq (1.5)T1$, and $L1 < (1.5)Tc$ are satisfied.

2. The multilayer ceramic electronic component of claim 1, wherein the multilayer ceramic electronic component is 1005-sized or greater.

3. The multilayer ceramic electronic component of claim 1, wherein, when L2 is a length from either end of the ceramic main body in the length direction thereof to an end of the second layer formed on the upper surface or the lower surface of the ceramic main body, $(1.5)L1 \leq L2$ is satisfied.

4. The multilayer ceramic electronic component of claim 1, wherein, when L2 is a length from either end of the ceramic main body in the length direction thereof to an end of the second layer formed on the upper surface or the lower surface of the ceramic main body, and L is a length of the ceramic main body, $L2 \leq (\frac{1}{3})L$ is satisfied.

5. The multilayer ceramic electronic component of claim 1, wherein, when L2 is a length from either end of the ceramic main body in the length direction thereof to an end of the second layer formed on the upper surface or the lower surface of the ceramic main body, and L is a length of the ceramic main body, $(1.5)L1 \leq L2 \leq (\frac{1}{3})L$ is satisfied.

6. The multilayer ceramic electronic component of claim 1, wherein the conductive metal includes at least one selected from the group consisting of gold, silver, palladium, copper, nickel, and alloys thereof.

7. The multilayer ceramic electronic component of claim 1, wherein the conductive resin includes at least one selected from the group consisting of a silver (Ag)-epoxy resin, a copper (Cu)-epoxy resin, and a copper (Cu)-coated silver (Ag) resin.

8. A multilayer ceramic electronic component, comprising:
a ceramic main body having internal electrodes alternately laminated therein; and
external electrodes formed on both ends of the ceramic main body in a length direction thereof,
wherein each of the external electrodes includes a first layer formed on the ceramic main body and including a conductive metal, and a second layer formed on the first layer and including a conductive resin, and
when Tc is a thickness of a cover layer of the ceramic main body, L1 is a length from either end of the ceramic main body in the length direction thereof to an end of the first layer formed on an upper surface or a lower surface of the ceramic main body, L2 is a length from either end of the ceramic main body in the length direction thereof to an end of the second layer formed on the upper surface or the lower surface of the ceramic main body, and L is a length of the ceramic main body, $Tc \leq 70$ μm and $(1.5)L1 \leq L2 \leq (\frac{1}{3})L$ are satisfied.

9. The multilayer ceramic electronic component of claim 8, wherein the multilayer ceramic electronic component is 1005-sized or greater.

10. The multilayer ceramic electronic component of claim 8, wherein the multilayer ceramic electronic component satisfies $L1 < (1.5)Tc$.

11. The multilayer ceramic electronic component of claim 8, wherein, when T1 is a thickness of the first layer at either end of the ceramic main body in a thickness direction thereof, and T2 is a thickness of the second layer at either end of the ceramic main body in the thickness direction thereof, $T2 \geq (1.5)T1$ is satisfied.

12. The multilayer ceramic electronic component of claim 11, wherein the multilayer ceramic electronic component satisfies $L1 < (1.5)Tc$.

13. The multilayer ceramic electronic component of claim 8, wherein the conductive metal includes at least one selected from the group consisting of gold, silver, palladium, copper, nickel, and alloys thereof.

14. The multilayer ceramic electronic component of claim 8, wherein the conductive resin includes at least one selected from the group consisting of a silver (Ag)-epoxy resin, a copper (Cu)-epoxy resin, and a copper (Cu)-coated silver (Ag) resin.

* * * * *